United States Patent
Cornelius et al.

(10) Patent No.: US 11,149,370 B2
(45) Date of Patent: Oct. 19, 2021

(54) ATMOSPHERIC-PRESSURE PLASMA PROCESSING APPARATUS AND METHOD

(71) Applicants: Carrie E. Cornelius, Durham, NC (US); Gregory A. Roche, Durham, NC (US); David W. Tyner, Benson, NC (US)

(72) Inventors: Carrie E. Cornelius, Durham, NC (US); Gregory A. Roche, Durham, NC (US); David W. Tyner, Benson, NC (US)

(73) Assignee: APJeT, Inc., Morrisville, NC (US)

(*) Notice: Subject to any disclaimer, the term of this patent is extended or adjusted under 35 U.S.C. 154(b) by 713 days.

(21) Appl. No.: 13/826,089

(22) Filed: Mar. 14, 2013

(65) Prior Publication Data

US 2014/0076861 A1 Mar. 20, 2014

Related U.S. Application Data

(60) Provisional application No. 61/702,919, filed on Sep. 19, 2012.

(51) Int. Cl.
*D06B 19/00* (2006.01)
*B23K 10/00* (2006.01)
(Continued)

(52) U.S. Cl.
CPC .......... *D06B 19/007* (2013.01); *B23K 10/003* (2013.01); *D06B 1/02* (2013.01);
(Continued)

(58) Field of Classification Search
CPC .. B23K 10/003; H05H 2245/123; H05H 1/46; H05H 2240/10; H05H 2001/466
(Continued)

(56) References Cited

U.S. PATENT DOCUMENTS

| 5,185,132 A | * | 2/1993 | Horiike | H01J 37/32018 |
| | | | | 118/720 |
| 6,262,523 B1 | * | 7/2001 | Selwyn | H01J 37/32009 |
| | | | | 313/231.31 |

(Continued)

FOREIGN PATENT DOCUMENTS

JP 2011146251 A * 7/2011

OTHER PUBLICATIONS

International Search Report, International Searching Authority, dated May 30, 2013, pp. 1-12.
(Continued)

*Primary Examiner* — Tu B Hoang
*Assistant Examiner* — Alba T Rosario-Aponte
(74) *Attorney, Agent, or Firm* — Samuel M. Freund; Cochran Freund & Young LLC

(57) ABSTRACT

A plasma processing apparatus including powered electrodes having elongated planar surfaces; grounded electrodes having elongated planar surfaces parallel to and coextensive with the elongated surfaces of the powered electrodes, and spaced-apart a chosen distance therefrom, forming plasma regions, is described. RF power is provided to the at least one powered electrode, both powered and grounded electrodes may be cooled, and a plasma gas is flowed through the plasma regions at atmospheric pressure; whereby a plasma is formed in the plasma regions. The material to be processed may be moved into close proximity to the exit of the plasma gas from the plasma regions perpendicular to the gas flow, and perpendicular to the elongated electrode dimensions, whereby excited species generated in the plasma exit the plasma regions and impinge unimpeded onto the material.

25 Claims, 8 Drawing Sheets

(51) Int. Cl.
  *H05H 1/46* (2006.01)
  *D06B 1/02* (2006.01)
(52) U.S. Cl.
  CPC ......... *H05H 1/46* (2013.01); *D10B 2401/021* (2013.01); *H05H 1/466* (2021.05); *H05H 2240/10* (2013.01); *H05H 2245/40* (2021.05)
(58) Field of Classification Search
  USPC ............ 219/121.51, 121.52, 121.55, 121.47; 315/111.21
  See application file for complete search history.

(56) References Cited

U.S. PATENT DOCUMENTS

| | | | |
|---|---|---|---|
| 2002/0129902 A1 | 9/2002 | Babayan et al. | |
| 2004/0052028 A1 | 3/2004 | O-Reilly | |
| 2005/0217798 A1* | 10/2005 | Sugiyama | H01J 37/32009 156/345.45 |
| 2005/0263070 A1 | 12/2005 | Fink | |
| 2006/0011299 A1 | 1/2006 | Condrashoff et al. | |
| 2006/0042545 A1 | 3/2006 | Shibata et al. | |
| 2006/0289401 A1* | 12/2006 | Kobayashi | C23C 16/045 219/121.43 |
| 2009/0200948 A1* | 8/2009 | Selwyn | H01J 37/32082 315/111.21 |
| 2010/0033096 A1* | 2/2010 | Choi | H01J 37/32091 315/111.21 |
| 2011/0005681 A1* | 1/2011 | Savas | C23C 16/24 156/345.33 |
| 2011/0006040 A1* | 1/2011 | Savas | C23C 16/24 216/71 |

OTHER PUBLICATIONS

Canadian Examination Report, dated Jan. 3, 2019, Application No. 2,895,670, three pages.
Mexican Non-Final Office Action, dated Jan. 14, 2019, Application No. MX/a/2015/003569, six pages.

* cited by examiner

ATMOSPHERIC-PRESSURE PLASMA PROCESSING APPARATUS AND METHOD

CROSS-REFERENCE TO RELATED APPLICATIONS

The present application claims the benefit of U.S. Provisional Patent Application No. 61/702,919 for "Atmospheric-Pressure Plasma Processing Apparatus And Method" which was filed on Sep. 19, 2012, the entire content of which is hereby specifically incorporated by reference herein for all that it discloses and teaches.

FIELD OF THE INVENTION

The present invention relates generally to apparatus and method for plasma processing of materials and, more particularly, to an atmospheric-pressure plasma processing apparatus capable of producing a stable discharge having a neutral gas temperature that can be controlled using a cooling system, for generation of active chemical species including gas metastable and radical species effective for large area plasma processing, whereby active chemical or active physical components of the plasma exit the discharge electrode region and impinge unimpeded onto a substrate disposed externally from the discharge region, and without simultaneous exposure of the substrate to the electrical influence of the plasma.

BACKGROUND OF THE INVENTION

The use of ionized gases (plasma) for treating, modifying and etching of material surfaces is well established. Both vacuum-based plasmas and those that operate at or near atmospheric pressure, have been used for surface modification of materials ranging from plastic wrap to non-woven materials and textiles, the plasma being used to provide an abundant source of active chemical species, which are formed inside the plasma, from the interaction between resident electrons in the plasma and neutral or other gas phase components of the plasma. Typically, the active species responsible for surface treatment processes have such short lifetimes that the substrate must be placed inside the plasma ("in-situ" processing). Thus, the substrate and at least one stable "precursor" gas are present together inside a process chamber in contact with the plasma ranging in excitation frequencies from DC to microwave frequencies so that the short-lived active chemical species generated by the plasma are able to react with the substrate before decay mechanisms, such as recombination, neutralization or radiative emission can de-activate or inhibit the intended surface treatment reactions.

In addition to vacuum-based plasmas, there are a variety of plasmas that operate at or near atmospheric pressure. Included are dielectric barrier discharges (DBDs), which have a dielectric film or cover placed on one or both of the powered and ground electrodes (which may be planar or annular in design); corona discharges, which typically involve a wire or sharply-pointed electrode; micro-hollow discharges, which consist of a series of closely-packed hollow tubes that form either the rf or ground electrode and is used with a counter electrode to generate a plasma; a "flow-through" design, which consists of parallel-placed screen electrode and in which a plasma is generated by the passage of gas through the two or more screen electrodes; plasma jets in which a high gas fraction of helium is used along with electrical power in the 2 MHz-100 MHz range and a close electrode gap to form an arc-free, non-thermal plasma; and a plasma "torch", which uses an arc intentionally formed between two interposed electrodes to generate extremely high temperatures for applications such as sintering, ceramic formation and incineration.

The use of atmospheric pressure gases for generating a plasma provides a greatly simplified means for treating large or high volume substrates, such as plastics, textiles, non-wovens, carpet, and other large flexible or inflexible objects, such as aircraft wings and fuselage, ships, flooring, commercial structures. Treatment of these substrates using vacuum-based plasmas would be complicated and prohibitively expensive. The present state of the art for plasmas operating at or near atmospheric pressure also limits the use of plasma for treatment of these commercially-important substrates.

Of the various atmospheric pressure plasmas, the Dielectric Barrier Discharge (DBD) is the most widely used, and is characterized by the use of a dielectric film or cover on one or both of the electrodes to prevent formation of a persistent arc that would otherwise form between the electrodes. Accumulating charge on the surface of the dielectric as an arc forms, quenches the arc, which typically reforms elsewhere on the electrode. The substrate itself may function as the dielectric cover, provided that it fully covers the exposed electrode. In some situations, a high gas fraction (>50%) of helium is added to the process gas to help homogenize the discharge. DBDs have the advantage of having a large gap between the electrodes, so that a thick substrate can readily be placed on one of the electrodes. However, since electrical power must be transmitted through the dielectric cover, the power density that a DBD discharge can achieve is limited. Low power density typically produces slow processing, because low-power density in the plasma also results in a slow generation rate of the active, chemical species responsible for materials processing. The dielectric cover on the electrode also inhibits heat removal since most electrical insulators also function as thermal insulators. Because of this, the gas temperature inside a DBD can often reach temperatures as high as 100° C.-200° C. during prolonged plasma operation.

The atmospheric-pressure plasma jet (APPJ) uses a process gas mixture consisting of >95% helium, electrical energy between 1 MHz and 100 MHz and a narrow gap between two conducting electrodes to achieve a stable, non-arcing plasma. Electrodes may be planar and parallel, or annular in design, but must have a uniform gap between the rf and ground electrodes. The use of helium gas mixtures with an electrode gap in the range of between 0.5 mm and 2.5 mm has been found to assist in the prevention of arcing when appropriate high frequencies are used to power the electrodes. Gas flow may be either along the longitudinal axis of the electrodes for the annular design, or may be along the planar axis for the parallel plate design. The advantages of this design over other atmospheric pressure discharges are the ability to generate a large-area discharge having high-power density suitable for fast processing, and the ability to efficiently cool the neutral gas temperature since dielectric coverings are not required, and since the use of solid metal electrodes permits internal water cooling to efficiently remove heat from the gases in the plasma.

An annular APPJ discharge apparatus where the gas is flowed between the rf and ground electrodes through a series of perforations in one of the uncooled electrodes has been used in a cleaning process.

A flow-through electrode design using a gas flow consisting predominantly of helium feed gas that flows through two metal screens that function as electrodes, one rf-powered and the other grounded has been reported. The discharge is created in the gap between the parallel, screen electrodes, which generally have the same spacing as the inter-electrode gap of the APPJ discharge. High gas flow rates through a large open area are required since the active chemical species must transit the distance between the point of creation in the plasma and the substrate which may be located several millimeters from the closest perforated electrode. Further, the metal screens cannot be water-cooled, leading to a high, neutral gas temperature (>150° C.), especially if high rf power is used since heat removal is limited to conduction at the point of contact with the housing, and from the heat capacity of the gas as it exits the plasma.

SUMMARY OF THE INVENTION

Accordingly, it is an object of embodiments of the present invention to provide an atmospheric-pressure plasma processing apparatus effective for producing a large area, temperature-controlled, stable plasma discharge, wherein active species generated in the plasma exit the discharge and impinge unimpeded on a material to be processed disposed outside of the discharge, but in close proximity thereto.

Another object of embodiments of the present invention is to provide an atmospheric-pressure plasma generating apparatus for producing active chemical species, wherein the plasma electrodes are cooled, thereby producing a neutral gas temperature that can be controlled.

Yet another object of embodiments of the present invention is to provide an atmospheric-pressure plasma generating apparatus effective for producing active chemical species, including gas metastables, ionic species and active physical components.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the atmospheric-pressure plasma processing apparatus hereof includes: at least one first electrically conducting electrode having a chosen height and at least one first elongated planar surface having a chosen length; at least one grounded second electrically conducting electrode having at least one second elongated planar surface parallel to and coextensive with the first planar surface, and spaced-apart a chosen distance therefrom, forming thereby at least one plasma region; an RF power supply in electrical connection with the at least one first electrode; a source of coolant having a chosen temperature for cooling the at least one first electrode and the at least one second electrode; a source of plasma gas; and a gas manifold for flowing plasma gas through the at least one plasma region and exiting the at least one plasma region through a long dimension of the at least one first planar surface and a corresponding long dimension of the at least one second planar surface; whereby a plasma is formed in the at least one plasma region.

In another aspect of the present invention and in accordance with its objects and purposes, the apparatus for atmospheric-pressure plasma processing of a material hereof includes: at least one first electrically conducting electrode having a chosen height and at least one first elongated planar surface having a chosen length; at least one grounded second electrically conducting electrode having at least one second elongated planar surface parallel to and coextensive with the first planar surface, and spaced-apart a first chosen distance therefrom, forming thereby at least one plasma region; an RF power supply in electrical connection with the at least one first electrode; a source of coolant having a chosen temperature for cooling the at least one first electrode and the at least one second electrode; a source of plasma gas; a gas manifold for flowing plasma gas through the at least one plasma region and exiting the at least one plasma region through a long dimension of the at least one first planar surface and a corresponding long dimension of the at least one second planar surface; whereby a plasma is formed in the at least one plasma region; and means for moving the material perpendicular to the long dimension of the at least one first planar surface and the at least one second planar surface at a second chosen distance therefrom, and perpendicular to the flow of the plasma gas out of the plasma region.

In still another aspect of the invention and in accordance with its objects and purposes, the method for atmospheric-pressure plasma processing hereof includes: flowing a plasma gas between a region defined by at least one first electrically conducting electrode having a chosen height and having at least one first elongated planar surface having a chosen length, and at least one grounded second electrically conducting electrode having at least one second elongated planar surface parallel to and coextensive with the first planar surface, and spaced-apart a chosen distance therefrom, whereby the plasma gas exits the region through a long dimension of the at least one first planar surface and a corresponding long dimension of the at least one second planar surface; applying RF power to the at least one first electrode from an RF power source, whereby at least one plasma is formed; and cooling the at least one first electrode and the at least one second electrode to a chosen temperature.

In yet another aspect of the invention and in accordance with its objects and purposes, the method for atmospheric-pressure plasma discharge processing of a material hereof includes: flowing a plasma gas between a region defined by at least one electrically conducting first electrode having at least one first elongated planar surface, and at least one grounded second electrically conducting electrode having at least one second elongated planar surface parallel to and coextensive with the first planar surface, and spaced-apart a first chosen distance therefrom, whereby the plasma gas exits the region through a long dimension of the at least one first planar surface and a corresponding long dimension of the at least one second planar surface; applying RF power to the at least one first electrode from an RF power source, whereby at least one plasma is formed; cooling the at least one first electrode and the at least one second electrode to a chosen temperature; and moving the material perpendicular to the long dimension of the at least one first planar surface and the at least one second planar surface at a second chosen distance therefrom, and perpendicular to the flow of the plasma gas out of the plasma region.

Benefits and advantages of the present invention include, but are not limited to, faster plasma processing speed resulting from an unobstructed path and a minimum distance for the excited species formed in the plasma to the material being processed. The lower neutral gas temperature, and the location of the material to be processed away from the electrical influence of the plasma, permit heat-sensitive substrates to be treated and heat-sensitive processes to be employed.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 8 is a graph of the power required in Watts for achieving 100 on the AATCC TM 22 Spray test as a function of electrode height, for 0.25 in, 0.5 in, and 1 in.

DETAILED DESCRIPTION OF THE INVENTION

Figure 1:
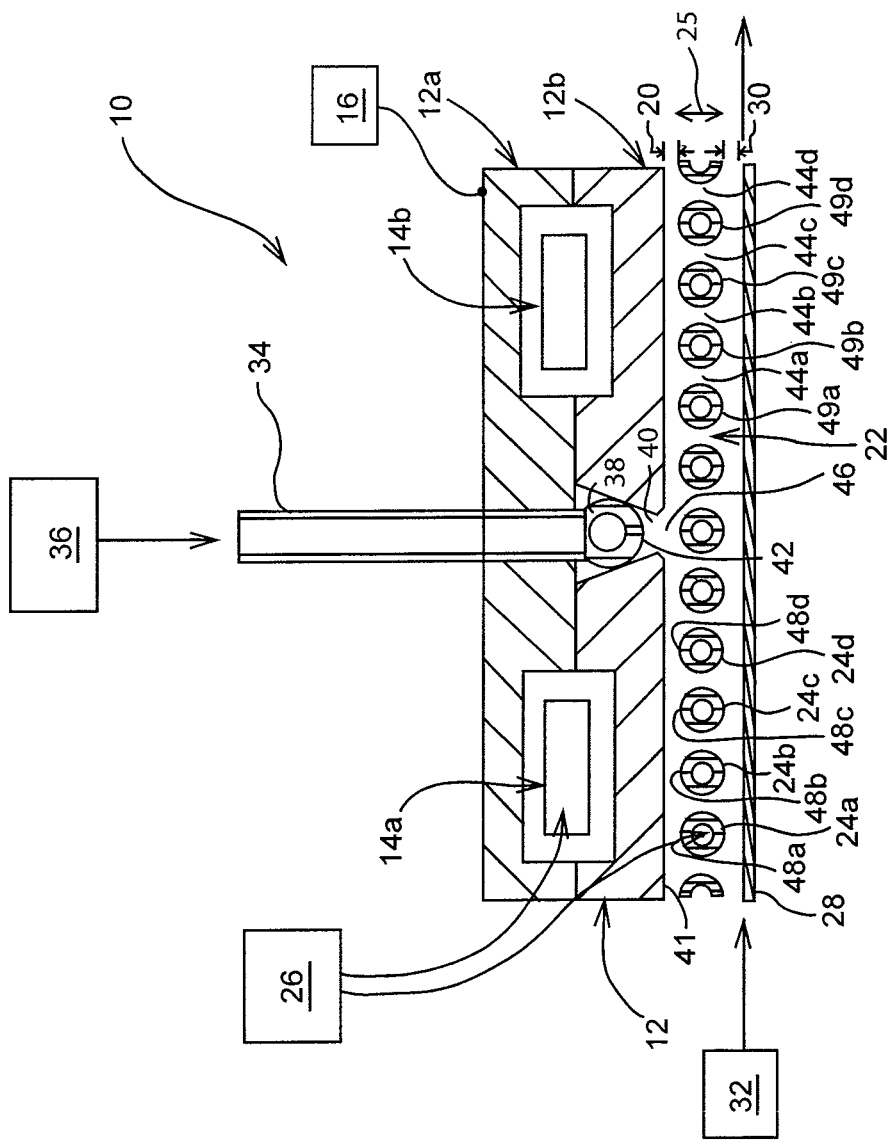
FIG. 1 is a schematic representation of a side view of a PRIOR ART plasma processing apparatus illustrating an RF electrode having liquid cooling channels, and at least one gas inlet tube port having a recessed gas distribution tube, a plurality of tubular grounded electrodes adapted for liquid cooling around which the plasma generated between the RF electrode and the tubular grounded electrodes passes, and the material to be processed disposed outside of the plasma near the grounded electrodes.

FIG. 1 is a schematic representation of a side view of a PRIOR ART (U.S. Patent Application Publication No. 2009/0200948, published Aug. 13, 2009) plasma processing apparatus illustrating plasma processing apparatus, 10, showing RF electrode, 12, having liquid cooling ducts, 14a, 14b, powered by RF power supply and RF matching network, 16, in electrical connection with electrode 12, whereby first chosen spacing, 20, between RF electrode 12 and planar ground electrode, 22, constructed using parallel, grounded, hollow circular or oval tubes, 24a-24d, having chosen diameter (major diameter for oval tubes), 25, is maintained. Electrical energy is supplied in a frequency range between about 1 MHz and about 100 MHz, the RF matching network being used to adjust for a load deviation from 50 Ohms in the apparatus. Chiller, 26, supplies liquid coolant to cooling ducts 14a, 14b and to hollow tubes 24a-24d, adapted for liquid cooling. Material to be processed, 28, is disposed outside of the plasma in the proximity of ground electrode 22, and maintained spaced-apart therefrom at second chosen spacing, 30. Material 28 may be moved during processing using an appropriate moving apparatus, 32. At least one gas inlet tube, 34, supplied by gas supply and manifold, 36, provides the appropriate gas mixture to at least one gas distribution tube, 38, there being at least one gas inlet tube 34 for each gas distribution tube 38, to maintain approximately constant gas pressure across gas distribution tube 38. Gas distribution tube 38 has holes spaced apart along the length thereof and facing grounded electrode 22, such that gas emerges through tapered channel, 40 opening out of bottom surface, 41, of RF electrode 12. Tapered channel 40 holds gas distribution tube 38a-38c firmly in place, and recessed from surface 41. Radiofrequency electrode 12 is shown to be divided into two portions, 12a and 12b, such that the channels 14a, 14b and 40 may be readily machined and gas distribution tube 38 may be installed, and for cleaning and maintenance as needed during operation of discharge apparatus 10. The direction of gas flow is through the opening between grounded tubes 24a-24d. Flowing gas is employed in the plasma generation process and to carry active components produced in the plasma discharge between the RF and ground electrodes in spacing 20 out of the plasma through the narrow spaces, 44a-44d, between tubes, 24a-24d, of grounded electrode 22, and onto workpiece 28.

Modeling and plasma observations of the PRIOR ART invention by the present inventors has shown that the densest plasma is formed between surface 41 of rf electrode 12 and surfaces 48a-48d of grounded tubes 24a-24d of electrode 22, that the gas flow is impeded and must traverse the diameter of the grounded tubes, and therefore only a small number of activated species reach substrate 28. The diameters of the circular tubes 24a-24d were reduced, and the spacing therebetween was increased by the present inventors, with the result that the flux of activated species increased (from the observation that the substrate processing speed increased). Increasing the flux of activated species by increasing the plasma density to increase the number of active species, improving the flow of the active species by eliminating ground tube electrodes 24a-24d as physical obstacles, and bringing substrate 28 closer to the plasma sources, such that a greater number of active species may reach the substrate unimpeded before they decay and become inactive, was expected by the present inventors to improve the apparatus processing speed.

Briefly an embodiment of the present plasma processing apparatus includes at least one first electrode having at least one first elongated planar surface; at least one grounded second electrode having at least one second elongated planar surface parallel to and coextensive with the first planar surface, and spaced-apart a chosen distance therefrom, forming thereby at least one plasma region; an RF power supply (frequencies between about 100 kHz and 100 MHz are effective); an RF matching circuit for coupling the RF from the RF power supply to the at least one first electrode; a source of coolant having a chosen temperature for cooling the first electrode and the second electrode; a source of plasma gas; a gas manifold for flowing plasma gas through the at least one plasma region and exiting the at least one plasma region perpendicular to an elongated dimension of the at least one first planar surface and the at least one second planar surface; whereby an atmospheric-pressure plasma is formed in the at least one plasma region. The material to be processed may be disposed at a chosen distance, which can be minimized, from the exit of the plasma gas from the at least one plasma region and moved perpendicular to the gas flow and perpendicular to the elongated electrode dimensions.

The plasma processing apparatus operates at atmospheric-pressure and produces a large area, non-thermal, stable discharge at power densities between about 5 W/cm$^3$ and approximately 50 W/cm$^3$, more specifically, up to about 25 W/cm$^3$ with a helium/nitrogen mixture, and up to about 50 W/cm$^3$ with a helium/oxygen mixture, with a neutral gas temperature that can be controlled using a cooling system for the electrodes. It should be noted that use of dielectric coatings on the plasma electrodes would significantly reduce this power density, and that severe arcing is controlled by the electronics. Moreover, arcing does not damage the fabric or other substrate being treated since these materials are outside of the plasma discharge. Therefore, dielectric coatings are not needed for the embodiments of the present invention. Typically, the chosen gas temperature entering the plasma regions may be about 20° C., while the neutral gas temperature exiting the plasma regions may be <70° C. In what follows, the term "atmospheric pressure" means pressures between about 500 Torr and about 1000 Torr. The active chemical species or active physical species of the plasma exit the plasma discharge before impinging on a substrate disposed outside of the discharge, thereby permitting substrate surface processing, without simultaneous exposure of the substrate to the electric fields between the electrodes. The high power densities, minimum distances between the plasma sources and the substrates, the lower operating plasma temperatures, and the placement of the material to be processed exterior to the plasma, permit accelerated processing rates, and treatment of most substrates.

The present plasma source may be used for polymerization (either free radical-induced or through dehydrogenation-based polymerization), surface cleaning and modification, etching, adhesion promotion, and sterilization, as examples. As will be discussed in more detail, hereinbelow, the addition of small amounts of $N_2$ or $O_2$, or other gases, or mixtures thereof to a noble gas, such as helium, as an example, or a mixture of noble gases, depending on the substrate and the desired coating chemistry, assist in the creation of longer lived, active species in the plasma that may be used for surface activation of materials or polymerization of monomers located externally to the plasma. Active chemical or physical species exiting the plasma impact the substrate before these species, which are generated in the plasma, are deactivated by collisions, thereby generating chemical and/or physical changes to the workpiece without exposure of the workpiece to the electrical field between the electrodes.

Figure 2:
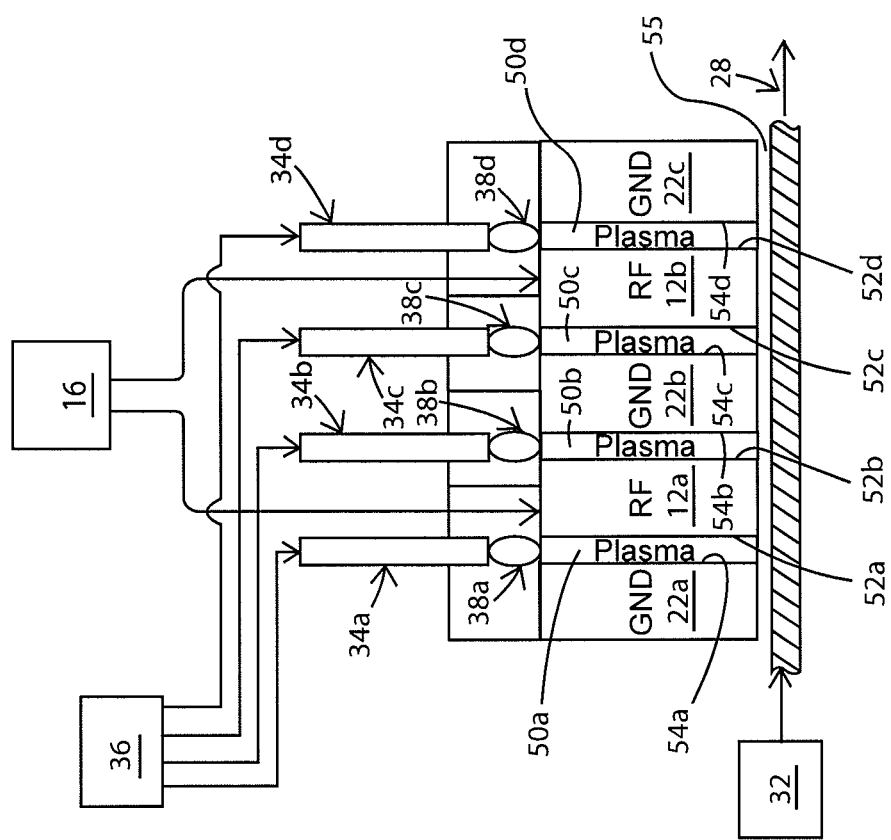
FIG. 2 is a schematic representation of a side view of a generalized embodiment of the apparatus of the present invention illustrating a plurality of rectangular plasma volumes formed between alternating RF powered and grounded parallel opposing planar electrode surfaces supplied with plasma gas, the plasma regions being oriented perpendicular to the material to be processed such that excited species therefrom impinge on the material to be processed without obstruction, and at a chosen distance which may be minimized.

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIG. 2, a schematic representation of a side view of a generalized embodiment of the apparatus of the present invention is shown, illustrating a plurality of rectangular plasma volumes or regions, 50a-50d, formed between alternating RF powered 52a-52d and grounded parallel opposing planar electrode surfaces, 54a-54d, respectively, supplied with plasma gas from source and manifold 36, directed into gas inlet tubes 34a-34d, and then into gas distribution tubes 38a-38d, as will be discussed in more detail hereinbelow. Plasma regions 50a-50d are oriented perpendicular to material to be processed 28, and the material may be brought arbitrarily close to the excited plasma gases exiting the discharge region of the electrodes, 55, (which may be between 0 mm and about 5 mm). Thus, excited species impinge unimpeded on the material from arbitrarily close ranges. Radiofrequency electrodes 12a and 12b, powered by RF source 16, which may include impedance matching circuitry, and grounded electrodes 22a-22c have elongated dimensions perpendicular to the illustrated side view. As will also be described in more detail hereinbelow, a chosen number of plasma regions 50a-50d may be included in a module, the plasma regions either being identical or differing in gas composition, flow rate or applied RF power density (with appropriate RF power matching, as needed, because of different discharge impedances) determined by their desired function.

Figure 3:
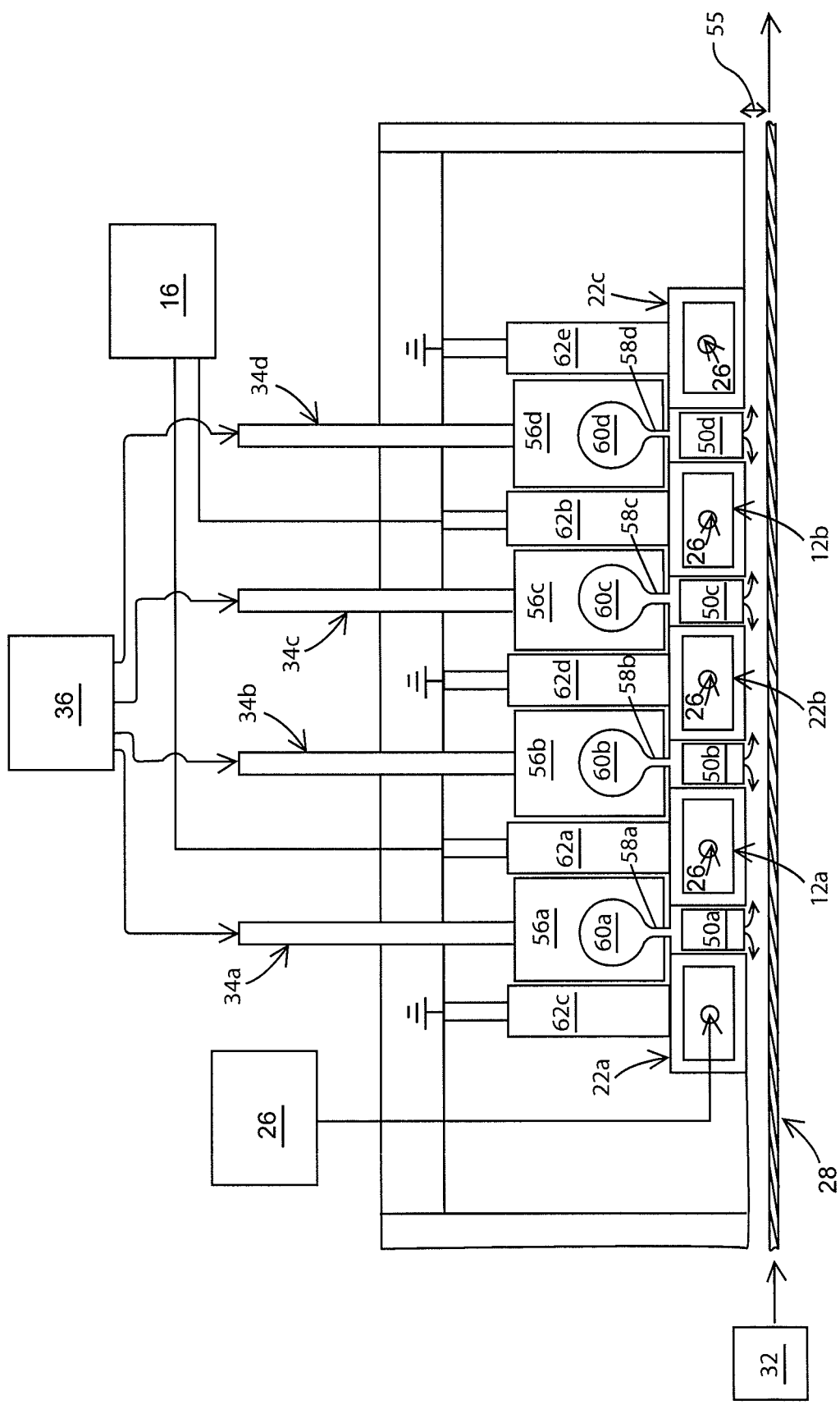
FIG. 3 is a schematic representation of a more detailed side view of the embodiment of the present invention shown in FIG. 2 hereof illustrating modular gas injection blocks having nozzle gas exits for controlling delivery of the plasma gas through the plasma volume between the electrodes, stanchions for supporting the water-cooled electrodes, and a source of RF power for the powered electrodes.

FIG. 3 is a schematic representation of a more detailed side view of the modular five electrode embodiment of the present invention shown in FIG. 2 hereof illustrating modular gas injection blocks, 56a-56d, four shown for a five electrode module, having elongated gas exit nozzles, 58a-58d, fed by gas inlet channels, 60a-60d, (in place of the gas inlet tubes 38a-38d of FIG. 2, hereof) for delivery of the plasma gas through plasma regions 50a-50d between RF electrodes 12a and 12b, and ground electrodes 22a-22c, held by stanchions, 62a, 62b, and 62c-62e, respectively, for supporting the electrodes cooled by fluid cooler 26, and RF power source 16, which may include RF matching circuitry, for providing RF energy to the powered electrodes, Other methods for cooling the electrodes may be anticipated. The electrode and gas injection block module may be housed and supported in a plastic block fabricated from thermoplastics such as polyetherimide (Ultem) or polyetherketone (PEEK), as examples. Gas exits gas nozzles 58a-58d (which may be between about 0.2 mm and approximately 4 mm in width and having a length equal to that of the at least one first elongated planar surface and the at least one second elongated planar surface and disposed such that plasma gas flows through the at least one plasma regions, with about 1.6 mm being used in the EXAMPLES hereinbelow) of gas injection blocks 56a-56d into the plasma regions 50a-50d. Electrode lengths, widths, gap spacings, and the number of electrodes are chosen depending on the material to be treated. For example, a typical textile prototype apparatus for testing the AATCC TM 22 water repellency of samples would be three, ¼"-square x 10"-long electrodes with 1.8 mm spacing between the electrodes, and two plasma regions. An example of an apparatus for industrial-scale textile fabric treatment might have five, ¼"-square x 72"-long electrodes with 2 mm spacing between electrodes, and four plasma regions.

Typical electrode spacings formed between alternating RF powered 52a-52d of FIG. 2 and grounded parallel opposing planar electrode surfaces, 54a-54d, respectively, may be between about 0.2 mm and approximately 4.0 mm, more typically between about 1.5 and about 2.5 mm. Electrodes may be fabricated from hollow, square or rectangular stainless steel, aluminum, copper, or brass tubing, or other metallic conductors, to permit water cooling. The edges of all electrodes about 1" from the ends thereof were chamfered in order to prevent arcing and edge effects. As will be described in the EXAMPLES, one-half inch wide electrodes having heights between about ¼ in. and about 1 in. were examined at 13.56 MHz. When only two of the four plasma regions were powered, and the process gas flow was adjusted to have the same total flow (Liters/min.) as was used in the four plasma region module, the processing results were identical (speed to achieve a 100 score on the AATCC TM 22 water repellency spray test) to those for the four plasma region module. Therefore, with the same total helium flow and one-half the RF power, two plasma regions were found to generate the same processing characteristics, thereby providing significant apparatus cost reduction. Further, process throughput has been found to be limited by the available helium flow rate, as will be illustrated in the EXAMPLES hereinbelow. The apparatus of FIG. 3, with two operating plasma regions was found to provide an approximately 18-fold improvement in processing speed per applied power (YPM/kW) over that for FIG. 1 (Prior Art) for the same substrate chemistry. This improvement results from: (1) the reduced RF power requirement due to the smaller plasma volume as a consequence of the smaller electrode height; (2) the reduced RF power requirement due to the smaller number of plasma slots, while keeping the total plasma gas flow constant; and (3) the fact that the distance from the plasma discharge to the substrate may be made arbitrarily small.

Figure 4:
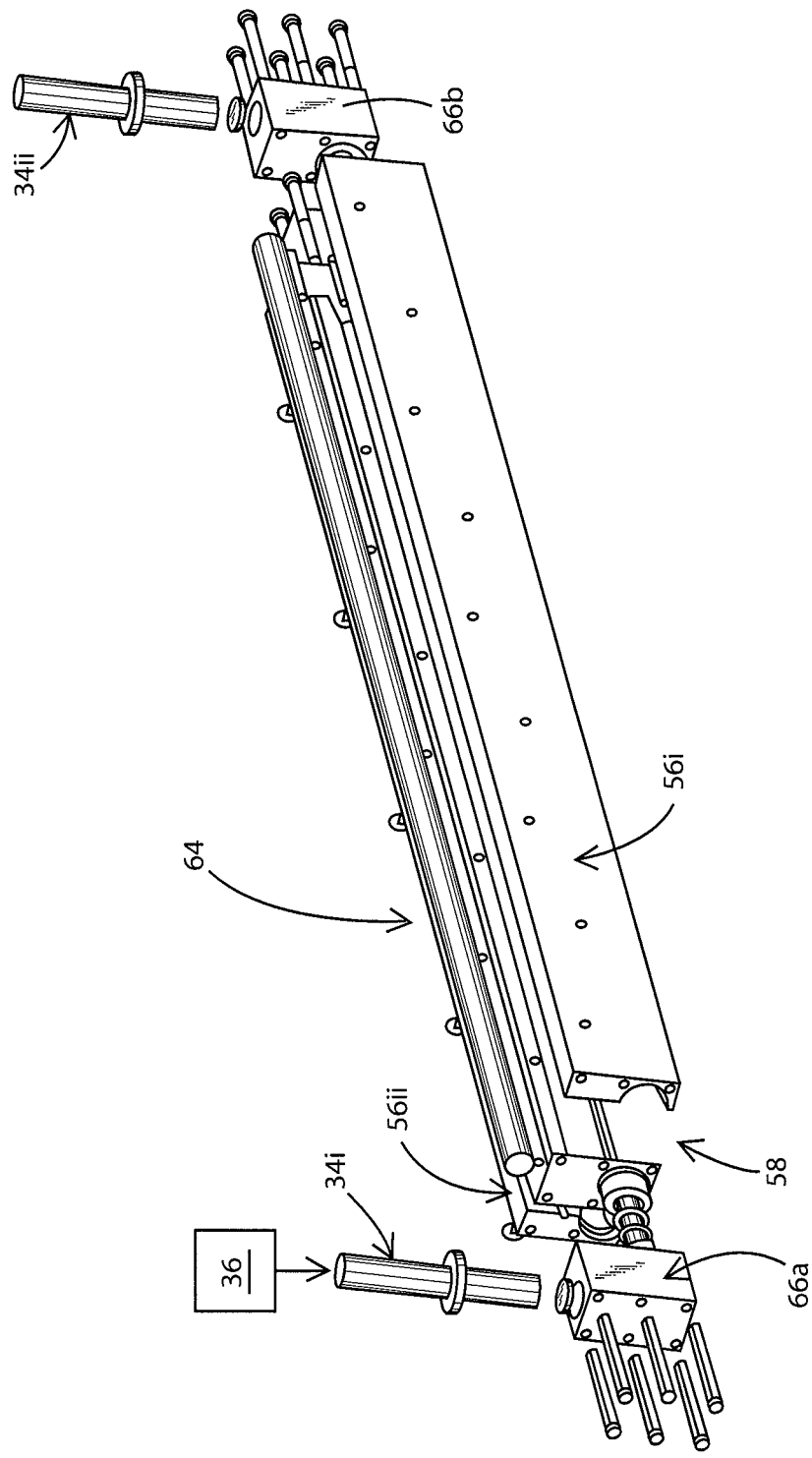
FIG. 4 is a schematic representation of a perspective view of an embodiment of the gas block of FIG. 3, hereof, illustrating a porous tube through which flow is established through the ends thereof, the gas uniformly exiting the tube along its length before passing through a nozzle gas exit extending the length of the gas block to achieve uniform gas flow.

FIG. 4 is a schematic representation of a perspective view of an embodiment of gas injection block 56 of FIG. 3, hereof, illustrating porous tube, 64, through which flow is established through gas inlet tubes, 34i, and, 34ii, and end blocks, 66a, and, 66b, from gas source 36, the gas uniformly exiting tube 64 along its length before passing through gas exit nozzle 58. Gas injection block 56 is shown split into two parts, 56i, and, 56ii, for ease of assembly, with appropriate gas sealing and mechanical assembly components shown in exploded view. Parts 56i and 56ii form nozzle 58, when assembled. Porous tube 64 may include Teflon, ceramic and metal tubes. Commercially available Teflon tubes having porosity between about 18% and approximately 73% have been used in embodiments of the present invention. Selection of tube porosity over this range may be made to provide a desired gas delivery uniformity for a given gas flow/pressure. Lower porosity tubes have higher back pressures, and tend to be more uniform; however, they allow less plasma gas flow, and consequently limit substrate processing speed.

As stated hereinabove, typical plasma gases may include helium or other noble gases or mixtures thereof, and small amounts of additives such as nitrogen or oxygen, as examples. The substrate may be treated with a chosen composition, which may react in the presence of the species exiting the plasma and, as will be discussed hereinbelow, a monomeric species may be polymerized and caused to adhere to the substrate by such species.

Figure 5:
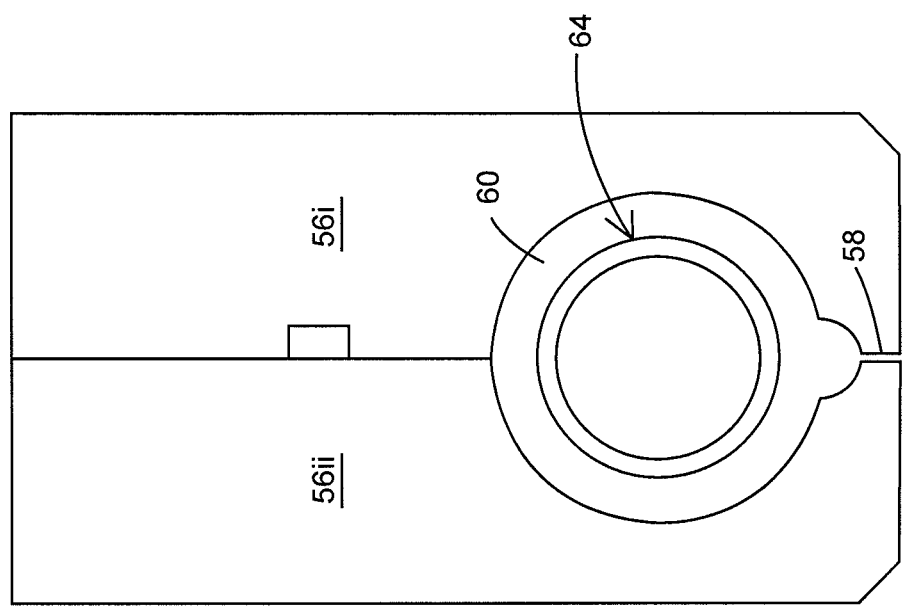
FIG. 5 is a schematic representation of a side view of the gas block illustrated in FIG. 4, hereof.

FIG. 5 is a schematic representation of a side view of the gas block illustrated in FIG. 4, hereof. Gas injection block 56 has been shown to prevent "parasitic plasma" formation above gas injection nozzle 58.

Figure 6:
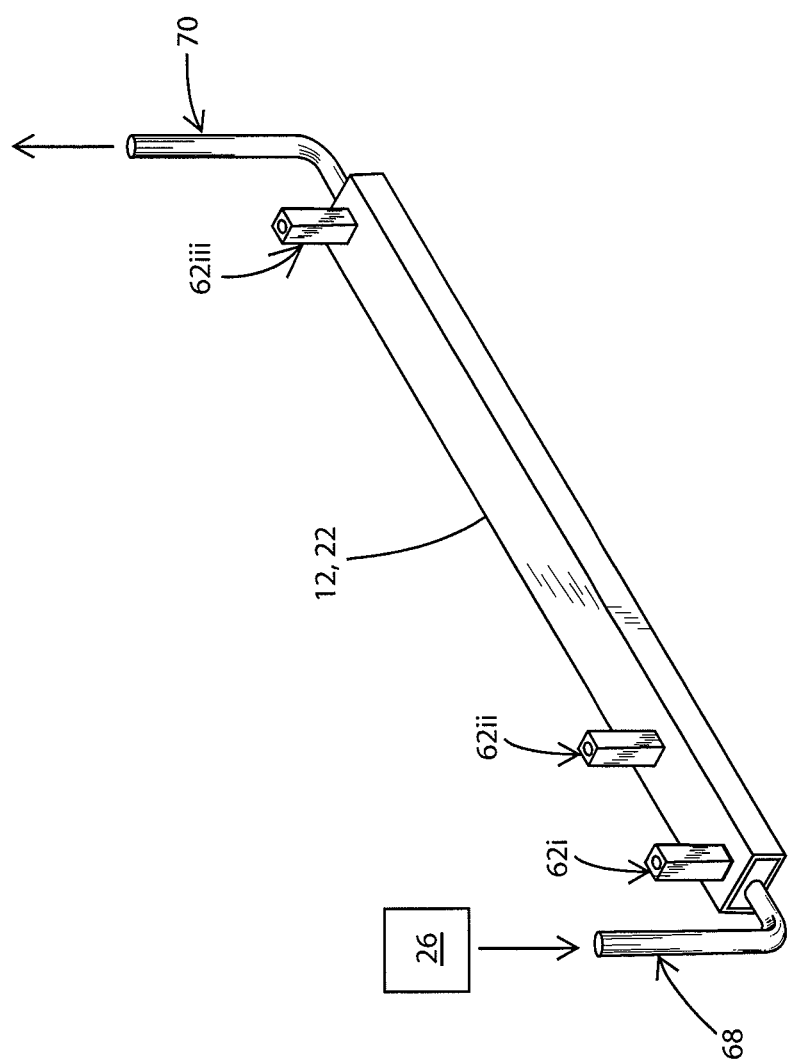
FIG. 6 is a schematic representation of a perspective view of either the water-cooled ground electrode or the water-cooled RF powered electrode shown in FIG. 3, hereof, illustrating the water cooling tubes and representative supporting stanchions.

FIG. 6 is a schematic representation of a perspective view of either the water-cooled ground electrode 22 or the water-cooled RF powered electrode 12 shown in FIG. 3, hereof, illustrating water (or other coolant) inlet tube, 68, supplied with coolant from cooler 26, outlet cooling tube, 70, which may be returned to cooler 26 or discarded, and representative supporting stanchions, 62i-62iii.

Having generally described the invention, the following EXAMPLES provides additional details:

EXAMPLE 1

In the following EXAMPLE 1, use of the embodiment of the present invention illustrated in FIG. 3, hereof, with two powered plasma regions (13.56 MHz), for processing fabrics is described. Clearly, many substrates may be treated by embodiments of the present apparatus. A monomer, which is polymerized by the action of free radicals, such as an acrylate, is applied to the fabric by spraying, as an example. The monomer may have various functional groups suitable for imparting desired properties to the fabric including repellency, wicking, antimicrobial activity, flame retardancy, as examples. After application to the fabric, the treated portion is moved into the vicinity of plasma regions 50a-50d such that excited species therefrom impinge thereon. The monomer is cured as the treated fabric is exposed to the plasma products, forming thereby a polymeric material which adheres to the fabrics. As an example, the hydrocarbon portions of polymerized 2-(Perfluorohexyl)ethyl acrylate (commonly referred to as C6) bond to each other and to the fabric, while the fluorinated chains face away from the fabric and repel water and oil.

When C6 coated polypoplin (polyester) fabric was treated using the apparatus of FIG. 1 (Prior Art), the addition of nitrogen showed no improvement to polymerization. With the apparatus of FIG. 3, however, when small amounts of nitrogen (0.1%-1.5% by volume) were added to helium plasma gas, an improvement in water, alcohol and oil repellency was observed. Nitrogen is inexpensive, does not require special handling and exhaust procedures. In contrast to the prior art, the plasma stability and process results are also unaffected by humidity when the present apparatus is employed. Similarly, when oxygen was added to the helium plasma gas (0.25%-0.31% by volume), surface changes on the fabric were observed, whereas no such changes were observed when oxygen was added to the apparatus of FIG. 1. The oxygen additive rendered the polypoplin more hydrophilic as determined by wicking and contact angle testing.

Figure 7:
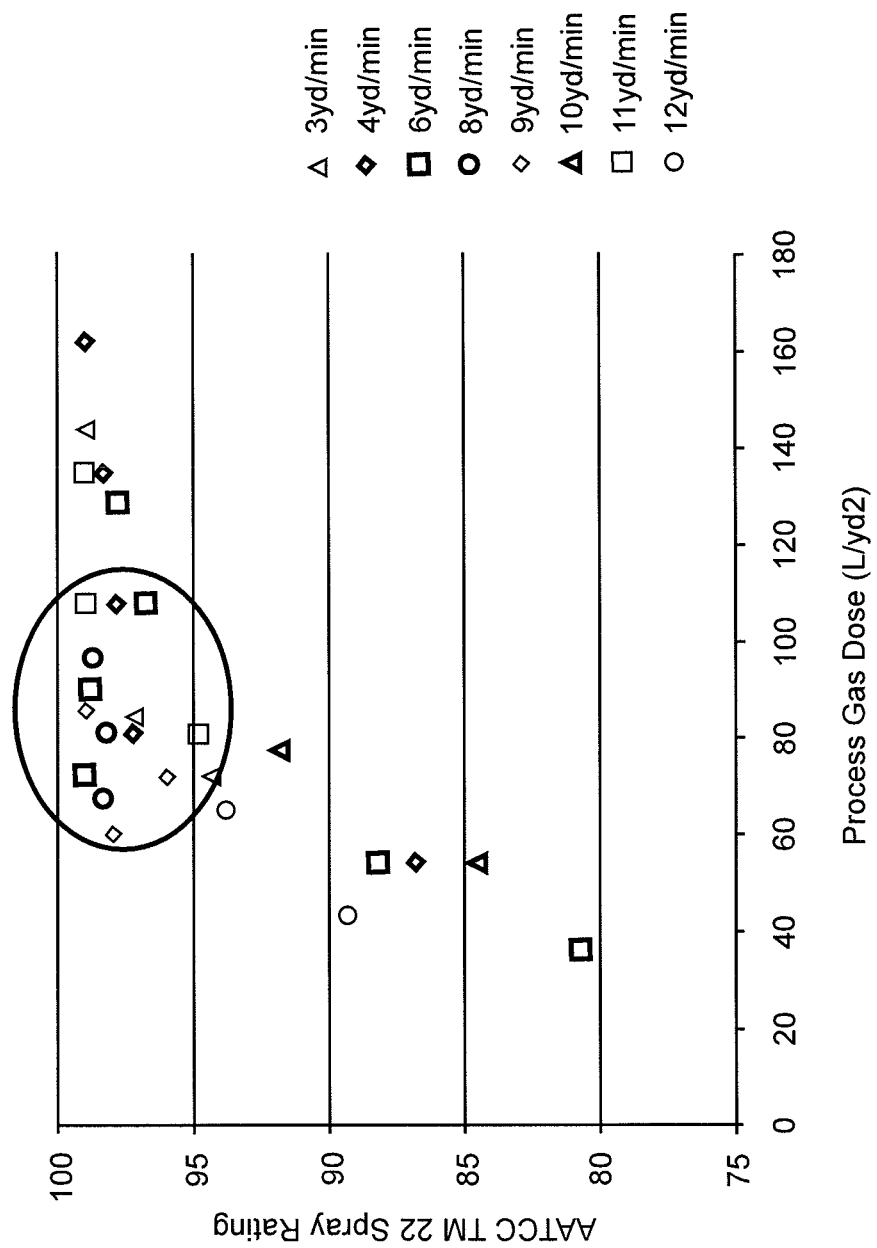
FIG. 7 is a graph of the effectiveness of plasma processing of polyester poplin fabric as a function of the process gas dose in liters per square yard of fabric.

FIG. 7 is a graph of the effectiveness of plasma processing of polypoplin fabric as a function of the plasma gas dose (helium plus a small amount of nitrogen) in liters per square yard of fabric. Approximately 90 L of plasma process gas per square yard of fabric yielded a 100 spray test result. The spacing between the fabric and the electrodes was 2 mm.

EXAMPLE 2

Figure 8:
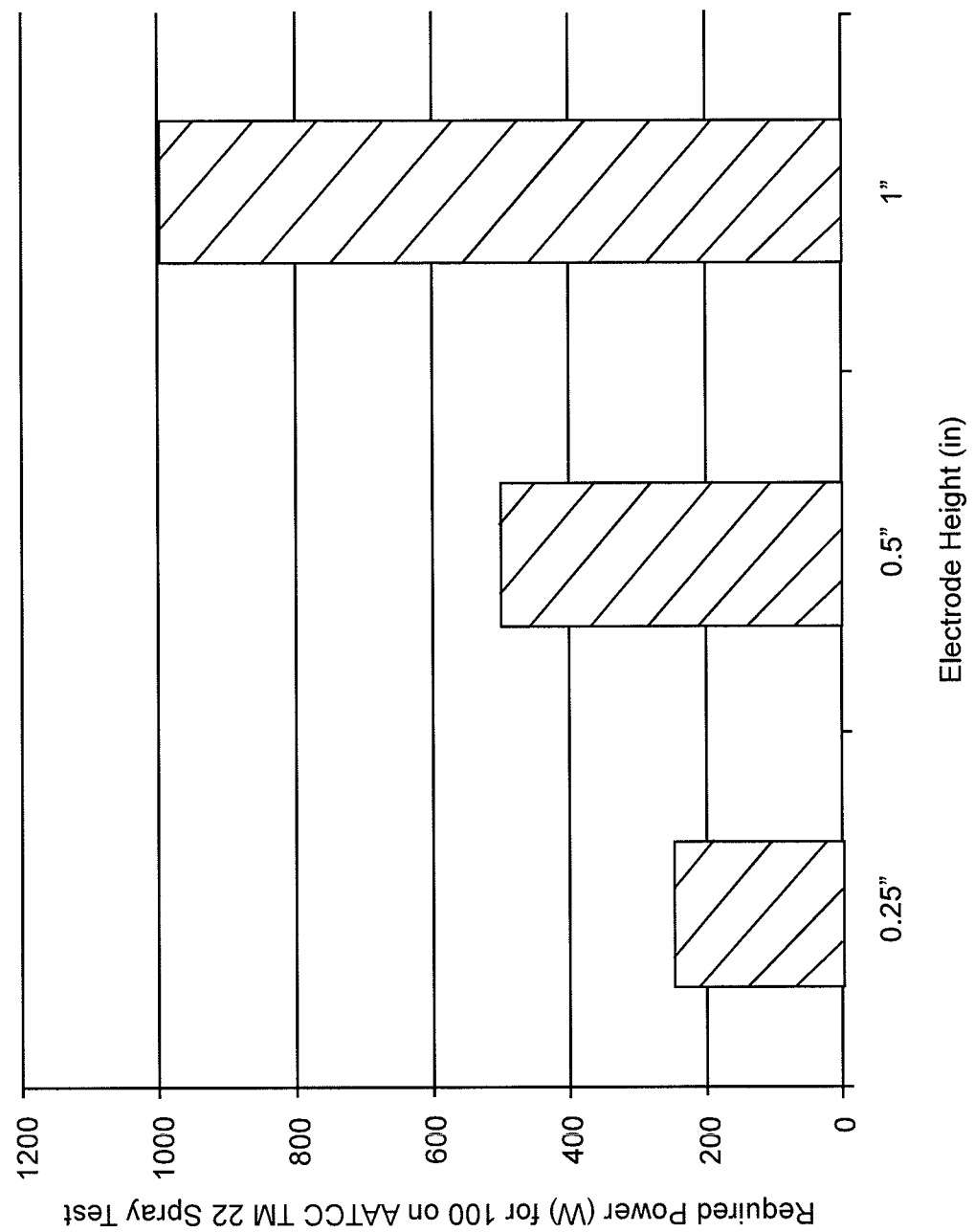

When the plasma gas is exposed to sufficient electric field from the electrode, active species generation occurs. Electrode heights investigated range from 1" to ¼". The thinner electrodes have smaller plasma volume, and hence require less RF power to maintain the plasma at a constant power density; therefore, RF power can be saved and smaller power generators can be used. Since the process results remain the same, there is an observed improvement in the YPM/kW metric. FIG. 8 is a graph of the power required in Watts at 13.56 MHz for achieving a score of 100 using the AATCC TM 22 water repellency spray test for undyed polyester poplin as a function of electrode height, for 0.25 in, 0.5 in, and 1 in. The fabric speed was 5 Yd/min., the process gas dose was 90 L/Yd$^2$ of He/N$_2$ gas blend, the power density was 16 W/cm$^3$ in each of 4 plasma regions (5 electrodes), the tube porosity was 53%, the electrode length was 12", the electrode gap was 2 mm, and the electrodes to fabric spacing was 0.5 mm. It is anticipated by the present inventors that smaller electrode heights, for example, ⅛", will provide further reduction in the RF power requirements for a given processing speed.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An atmospheric-pressure plasma material processing apparatus comprising: at least one first electrically conducting electrode having a chosen height and at least one first elongated planar surface having a chosen length; at least one grounded second electrically conducting electrode having at least one second elongated planar surface parallel to and coextensive in all directions with the at least one first elongated planar surface, and spaced-apart a chosen distance therefrom, forming thereby at least one atmospheric pressure plasma region, there being areas of juxtaposed first conducting electrode and second conducting electrode without dielectric material therebetween; an RF power supply in electrical connection with said at least one first electrode for applying electric fields between said at least one first electrically conducting electrode and said at least one grounded second electrically conducting electrode; a source of coolant having a chosen temperature for cooling the at least one first elongated electrode and the at least one second elongated electrode: a source of plasma gas; at least one electrically non-conducting, elongated gas block having an elongated chamber therein in fluid communication with one of the at least one atmospheric pressure plasma region; a porous tube disposed within the elongated chamber of said at least one gas block in fluid communication with said source of plasma gas for uniformly flowing plasma gas through the at least one atmospheric pressure plasma region, said plasma gas exiting the at least one atmospheric pressure plasma region simultaneously through a long dimension of the at least one first elongated planar surface and a corresponding long dimension of the at least one second elongated planar surface; whereby a plasma is formed in the at least one atmospheric pressure plasma region, and whereby said material is not exposed to the electric fields between said at least one first electrically conducting electrode and said at least one grounded electrically conducting electrode.

2. The apparatus of claim 1, wherein each of said at least one first electrode and said at least one second electrode comprises a hollow portion, a fluid inlet to the hollow portion and a fluid outlet therefrom, whereby the coolant is directed into the fluid inlet, through the hollow portion and through the outlet of each said at least one first electrode and said at least one second electrode.

3. The apparatus of claim 2, wherein each of said at least one first electrode and said at least one second electrode comprises a hollow square or rectangular metallic conductor.

4. The apparatus of claim 1, wherein plasma gas is flowed into the at least one plasma region through a long dimension of the at least one first elongated planar surface and a same long dimension of said at least one second elongated planar surface opposite the at least one plasma region therefrom.

5. The apparatus of claim 1, wherein the chosen height is selected such that power supplied to the plasma by said RF power supply is minimized.

6. The apparatus of claim 1, wherein the chosen height is between about 3 mm and about 25 mm.

7. The apparatus of claim 5, wherein the chosen distance is between about 0.2 mm and about 4 mm.

8. The apparatus of claim 1, wherein said porous tube comprises a Teflon tube.

9. The apparatus of claim 1, wherein said RF power supply comprises RE impedance matching circuitry for providing RF to said at least one RF electrode.

10. The apparatus of claim 1, wherein the RF comprises frequencies between about 100 kHz and about 100 MHz.

11. The apparatus of claim 1, wherein the chosen temperature is about 20° C.

12. The apparatus of claim 1, wherein gas exiting the plasma has a temperature <70° C.

13. An apparatus for atmospheric-pressure plasma processing of a material, comprising: at least one first electrically conducting electrode having a chosen height and at least one first elongated planar surface having a chosen length; at least one grounded second electrically conducting electrode having at least one second elongated planar surface parallel to and coextensive in all directions with the at least one first planar surface, and spaced-apart a first chosen distance therefrom, forming thereby at least one atmospheric pressure plasma region, there being areas of juxtaposed first conducting electrode and second conducting electrode without dielectric material therebetween; an RF power supply in electrical connection with said at least one first electrode for applying an electric fields between said at least one first electrically conducting electrode and said at least one grounded second electrically conducting electrode; a source of coolant having a chosen temperature for cooling the at least one first electrode and the at least one second electrode; a source of plasma gas; at least one electrically non-conducting, gas block having a chamber therein in fluid communication with one of the at least one atmospheric pressure plasma region; a porous tube disposed within the chamber of said at least one gas block in fluid communication with said source of plasma gas for uniformly flowing plasma gas through the at least one atmospheric pressure plasma region, said plasma gas exiting the at least one atmospheric pressure plasma region simultaneously through a long dimension of the at least one first planar surface and a corresponding long dimension of the at least one second planar surface; whereby a plasma is formed in the at least one atmospheric pressure plasma region, and whereby said material is not exposed to the electric fields between said at least one first electrically conducting electrode and said at least one grounded electrically conducting electrode; and means for moving the material perpendicular to the long dimension of the at least one first planar surface and corresponding long dimension of the at least one second planar surface, both at a same second chosen distance therefrom, and perpendicular to the flow of the plasma gas out of the atmospheric pressure plasma region.

14. The apparatus of claim 13, wherein each of said at least one first electrode and said at least one second electrode comprises a hollow portion, a fluid inlet to the hollow portion and a fluid outlet therefrom, whereby the coolant is directed into the fluid inlet, through the hollow portion and through the outlet of each said at least one first electrode and said at least one second electrode.

15. The apparatus of claim 13, wherein each of said at least one first electrode and said at least one second electrode comprises a hollow square or rectangular metallic conductor.

16. The apparatus of claim 13, wherein plasma gas is flowed into the at least one plasma region through a long dimension of the at least one first elongated planar surface and a same long dimension of the at least one second elongated planar surface opposite the at least one plasma region therefrom.

17. The apparatus of claim 13, wherein the chosen height is selected such that power supplied to the plasma by said RF power supply is minimized.

18. The apparatus of claim 13, wherein the chosen height is between about 3 mm and about 25 mm.

19. The apparatus of claim 17, wherein the first chosen distance is between about 0.2 mm and about 4 mm.

20. The apparatus of claim 13, wherein said porous tube comprises a Teflon tube.

21. The apparatus of claim 13, wherein said RF power supply comprises RF impedance matching circuitry for providing RF to said at least one RF electrode.

22. The apparatus of claim 13, wherein the RF comprises frequencies between about 100 kHz and about 100 MHz.

23. The apparatus of claim 13, wherein the chosen temperature is about 20° C.

24. The apparatus of claim 13, wherein gas exiting the plasma has a temperature <70° C.

25. The apparatus of claim 13, wherein the second chosen distance is between about 0 mm and about 5 mm.

\* \* \* \* \*